US012686087B2

(12) United States Patent
Ihrke et al.

(10) Patent No.: US 12,686,087 B2
(45) Date of Patent: Jul. 21, 2026

(54) MANUFACTURING SYSTEM INCLUDING MOBILE CART WITH TRUNNION AXIS CONTROL

(71) Applicant: GM GLOBAL TECHNOLOGY OPERATIONS LLC, Detroit, MI (US)

(72) Inventors: Chris A. Ihrke, Hartland, MI (US); Miguel Arturo Saez, Clarkston, MI (US); John Patrick Spicer, Plymouth, MI (US); Ahmad Almarkhi, Farmington Hills, MI (US); Tom Malburg, Romeo, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 581 days.

(21) Appl. No.: 18/326,269

(22) Filed: May 31, 2023

(65) Prior Publication Data

US 2024/0399517 A1     Dec. 5, 2024

(51) Int. Cl.
B23P 21/00 (2006.01)
B23K 37/04 (2006.01)
(Continued)

(52) U.S. Cl.
CPC ......... B23P 21/004 (2013.01); B25J 11/0055 (2013.01); B23K 37/0426 (2013.01); B23P 2700/50 (2013.01); B62D 65/022 (2013.01)

(58) Field of Classification Search
CPC ...................................... B23K 37/04–37/0538
See application file for complete search history.

(56) References Cited

U.S. PATENT DOCUMENTS 4,638,902 A * 1/1987 Kellner ................ B23K 37/047
198/345.1
5,125,141 A * 6/1992 Katoh .................. B23Q 1/4804
269/57
(Continued)

FOREIGN PATENT DOCUMENTS

CZ          2017834 A3 * 3/2019 ......... B23K 37/0294
DE       19713860 A1 * 10/1998 ............. B62D 65/00
(Continued)

OTHER PUBLICATIONS

Translation of JP_2000158135_A (Year: 2000).*
U.S. Appl. No. 17/943,644, filed Sep. 13, 2022, Saez et al.

*Primary Examiner* — Jacob J Cigna

(57) ABSTRACT

A manufacturing system configured for processing a workpiece. The manufacturing system includes a mobile cart with: a first mounting assembly and a second mounting assembly both configured to support the workpiece, and the first mounting assembly further configured to rotate the workpiece; and a first mechanical coupling in cooperation with the first mounting assembly such that rotation of the first mechanical coupling rotates the first mounting assembly. A docking station includes a second mechanical coupling and a motor configured to rotate the second mechanical coupling, the second mechanical coupling configured to cooperate with the first mechanical coupling such that rotation of the second mechanical coupling rotates the first mechanical coupling and the workpiece supported by the first mounting assembly and the second mounting assembly.

18 Claims, 8 Drawing Sheets

(51) Int. Cl.
 B25J 11/00 (2006.01)
 B62D 65/02 (2006.01)

(56) References Cited

U.S. PATENT DOCUMENTS

| 5,174,488 | A | * | 12/1992 | Alborante | .............. | B62D 65/02 |
| | | | | | | 228/4.1 |
| 7,178,227 | B2 | * | 2/2007 | Ghuman | ................ | B62D 65/02 |
| | | | | | | 29/559 |
| 11,203,386 | B2 | * | 12/2021 | Lee | ......................... | B62D 65/18 |
| 11,254,381 | B2 | * | 2/2022 | Rawas | .................... | B25J 9/0096 |
| 11,396,100 | B2 | * | 7/2022 | Krause | ................. | G06F 3/0346 |
| 11,478,882 | B2 | * | 10/2022 | Lee | ......................... | B23K 31/02 |
| 12,325,142 | B2 | * | 6/2025 | Saez | ...................... | B25J 9/0009 |
| 2004/0055131 | A1 | * | 3/2004 | Ghuman | .............. | B25J 17/0216 |
| | | | | | | 29/429 |
| 2009/0123264 | A1 | * | 5/2009 | Hartmann | .............. | B25J 9/1682 |
| | | | | | | 414/798.2 |
| 2018/0265149 | A1 | * | 9/2018 | Park | ........................ | B23K 31/02 |
| 2024/0083034 | A1 | * | 3/2024 | Saez | ..................... | G06T 7/0004 |

FOREIGN PATENT DOCUMENTS

| JP | S62238099 | A | * | 10/1987 | | |
| JP | S62279098 | A | * | 12/1987 | | |
| JP | H02220775 | A | * | 9/1990 | | |
| JP | 2000158135 | A | * | 6/2000 | | |
| JP | 7422223 | B2 | * | 1/2024 | ............. | H05K 13/04 |
| KR | 101686752 | B1 | * | 12/2016 | ............. | B62D 65/00 |
| KR | 20170015784 | A | * | 2/2017 | .......... | B62D 65/028 |
| WO | WO-0071292 | A1 | * | 11/2000 | .............. | B23Q 1/26 |
| WO | WO-2004085233 | A1 | * | 10/2004 | ............. | B62D 65/02 |

* cited by examiner

MANUFACTURING SYSTEM INCLUDING MOBILE CART WITH TRUNNION AXIS CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a manufacturing system including a mobile cart with trunnion axis control.

Manufacturing, such as vehicle manufacturing, includes numerous different stages. Some stages include transporting a workpiece, such as a vehicle chassis, to a work cell. At the work cell, the workpiece undergoes various processes. For example, the work cell may include cutting robots for cutting the workpiece. After the processing at the work cell is complete, the workpiece is transported from the work cell to the next manufacturing stage.

SUMMARY

The present disclosure includes, in various features, a manufacturing system configured for processing a workpiece. The manufacturing system includes a mobile cart with: a first mounting assembly and a second mounting assembly both configured to support the workpiece, and the first mounting assembly further configured to rotate the workpiece; and a first mechanical coupling in cooperation with the first mounting assembly such that rotation of the first mechanical coupling rotates the first mounting assembly. A docking station includes a second mechanical coupling and a motor configured to rotate the second mechanical coupling, the second mechanical coupling configured to cooperate with the first mechanical coupling such that rotation of the second mechanical coupling rotates the first mechanical coupling and the workpiece supported by the first mounting assembly and the second mounting assembly.

In further features, the mobile cart includes wheels.

In further features, the mobile cart includes a handle and is configured to be pushed by a user.

In further features, the workpiece is a vehicle chassis.

In further features, the first mounting assembly and the second mounting assembly are on opposite ends of the mobile cart and are configured to couple to opposite ends of the vehicle chassis to rotate the vehicle chassis about a longitudinal axis thereof.

In further features, the first mounting assembly and the second mounting assembly are configured to rotate to any position about an axis up to 360°.

In further features, the docking station is mounted in a work cell including a cutting robot configured to cut the workpiece and a measuring robot configured to track movement of the workpiece.

In further features, a control module is configured to control the measuring robot and the motor of the docking station to control rotation of the workpiece when the mobile cart is in cooperation with the docking station.

In further features, a control module is configured to control both the cutting robot and the motor of the docking station to simultaneously control rotation of the workpiece and cutting of the workpiece by the cutting robot.

In further features, the mobile cart includes a first pneumatic coupling and a first electrical coupling; and the docking station further includes a second pneumatic coupling and a second electrical coupling configured to couple with the first pneumatic coupling and the first electrical coupling respectively to transfer pneumatic power and control signals from the docking station to the mobile cart.

In further features, the first mounting assembly includes a first brake and the second mounting assembly includes a second brake, the first brake and the second brake are configured to prevent rotation of the first mounting assembly and the second mounting assembly respectively when the mobile cart is disconnected from the docking station.

In further features, the docking station includes a first encoder configured to measure a first rotational position of the second mechanical coupling and generate a first signal identifying the first rotational position, the first rotational position corresponds to a rotational orientation of the first mounting assembly; the second mounting assembly includes a second encoder configured to measure a second rotational position of the second mounting assembly and generate a second signal identifying the second rotational position; and a control module configured to receive the first signal and the second signal, and generate a notification when a difference between the first rotational position and the second rotational position exceeds a predetermined difference, the notification indicating that a workpiece mounted to the first mounting assembly and the second mounting assembly is being twisted.

In further features, between the first mounting assembly and the second mounting assembly is a base defining a clean out for material cut from the workpiece; and the base is adjustable lengthwise and widthwise to accommodate different sized workpieces.

The present disclosure further includes, in various features, a manufacturing system configured for processing a vehicle chassis. The manufacturing system includes a work cell with: a cutting robot; a measuring robot; and a docking station including a drive unit. A mobile cart is configured to be moved into and out of the work cell. The mobile cart includes: a first rotatable member spaced apart from a second rotatable member, both the first rotatable member and the second rotatable member are configured to support and rotate the vehicle chassis about a trunnion axis of the vehicle chassis; and a mechanical coupling in cooperation with the first rotatable member, the mechanical coupling configured to cooperate with the drive unit of the docking station such that rotation of the drive unit rotates the mechanical coupling and the first rotatable member.

In further features, the mobile cart includes wheels.

In further features, the mobile cart includes a handle and is configured to be pushed by a user.

In further features, the docking station includes a first encoder configured to measure a first rotational position of the drive unit and generate a first signal identifying the first rotational position, the first rotational position corresponds to a rotational orientation of the first rotatable member; the second rotatable member is in cooperation with a second encoder configured to measure a second rotational position of the second rotatable member and generate a second signal identifying the second rotational position; and a control module configured to receive the first signal and the second signal, and generate a notification when a difference between the first rotational position and the second rotational position exceeds a predetermined difference, the notification indicating that the vehicle chassis is being twisted.

In further features, a control module is configured to control the measuring robot and the drive unit, and incorporate the trunnion axis as an axis of the measuring robot. After rotation of the vehicle chassis by the first rotatable member and the second rotatable member about the trunnion axis, the control module is configured to identify a rotated position of the vehicle chassis and input the rotated position to the measuring robot; and the control module is configured to identify the rotated position based on at least one of a degree of rotation of the drive unit and location of a datum point on the vehicle chassis identified by the measuring robot.

In further features, a control module is configured to control the cutting robot and the drive unit, and incorporate the trunnion axis as an axis of the cutting robot. The control module is configured to simultaneously control the drive unit to rotate the vehicle chassis about the trunnion axis and control the cutting robot to cut the vehicle chassis.

In further features, the present disclosure includes a manufacturing system configured for processing a vehicle chassis. The manufacturing system has a work cell including: a cutting robot; a measuring robot; a docking station including a drive unit; and a control module configured to simultaneously control the drive unit and the cutting robot. A mobile cart is configured to be moved into and out of the work cell and docked with the docking station. The mobile cart includes: a first rotatable member spaced apart from a second rotatable member, both the first rotatable member and the second rotatable member are configured to support the vehicle chassis for rotation about a trunnion axis of the vehicle chassis; and a mechanical coupling in cooperation with the first rotatable member, the mechanical coupling configured to cooperate with the drive unit of the docking station such that rotation of the drive unit rotates the mechanical coupling and the first rotatable member. The control module is configured to: incorporate the trunnion axis as an axis of the cutting robot; and simultaneously control the drive unit to rotate the vehicle chassis about the trunnion axis and control the cutting robot to cut the vehicle chassis.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
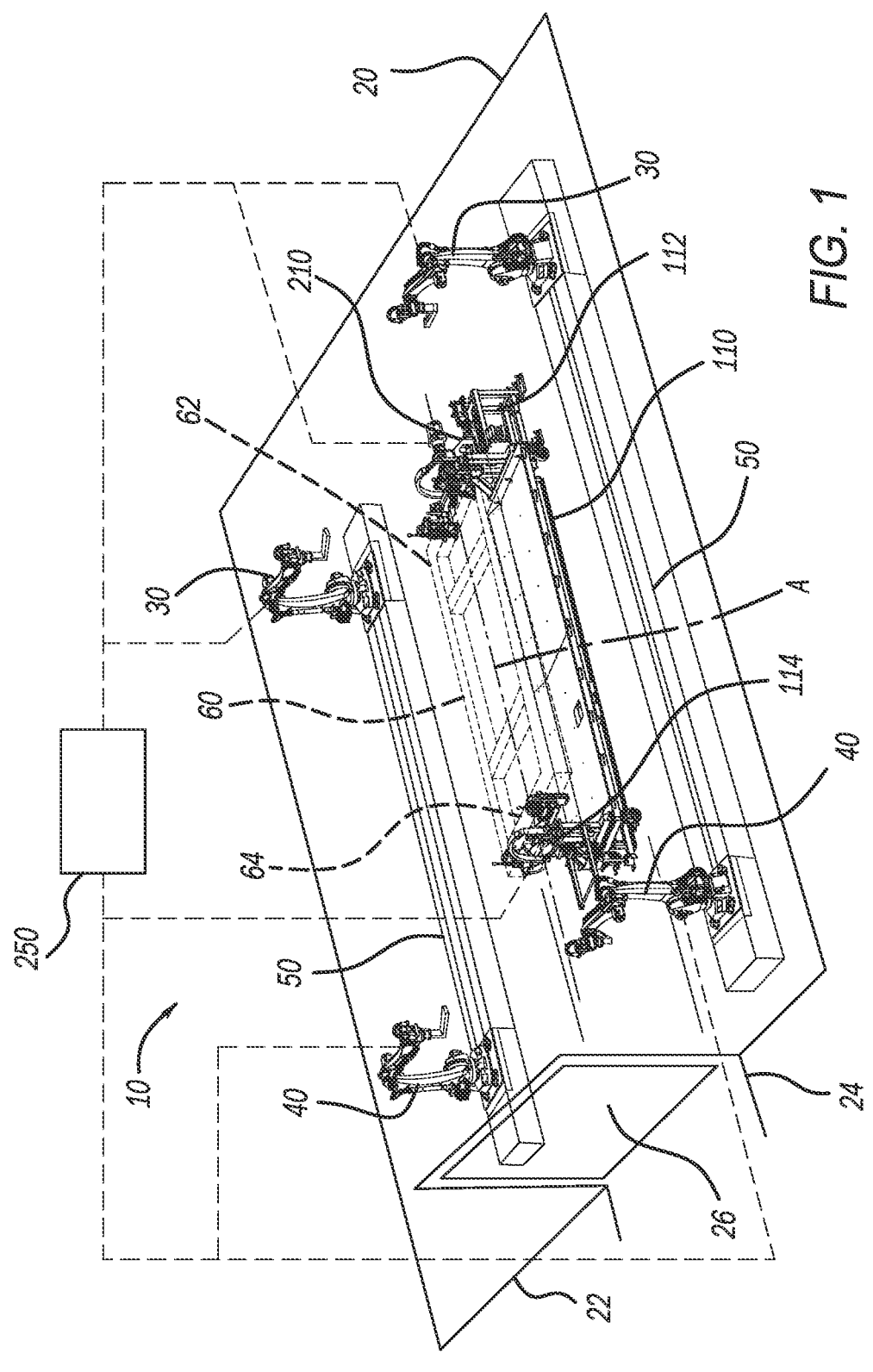
FIG. 1 is a perspective view of an exemplary work cell configured to process a workpiece in accordance with the present disclosure, the workpiece mounted to a mobile cart.

FIG. 1 illustrates an exemplary manufacturing system 10 in accordance with the present disclosure for processing a workpiece. The workpiece may be any suitable workpiece, such as any suitable automotive component. For example, and as illustrated, the workpiece may be an automotive chassis 60. The present disclosure is not limited to automotive components, and thus the workpiece may be any suitable non-automotive component or assembly as well.

The present disclosure generally includes a mobile cart 110 configured to support the chassis 60 and transport the chassis 60 between various manufacturing locations. The cart 110 is configured to cooperate with a docking station 210, which is configured to rotate portions of the cart 110 that support the chassis 60, so as to rotate the chassis 60 along its trunnion axis A. For example, the cart 110 is configured to rotate the chassis 60 about the trunnion axis A from a level or flat orientation of FIG. 2A to a rotated orientation of FIG. 2B. The chassis 60 may be rotated to any suitable position about a 180° axis (or in some applications the cart 110 may be configured to rotate the workpiece about an axis of up to 360°). Rotating the chassis 60 facilitates cutting the chassis 60 and otherwise processing the chassis 60.

The manufacturing system 10 includes a work cell 20. The work cell 20 has an outer wall 22, which defines an opening 24 of the work cell 20. A door 26 is at the opening 24. Within the work cell 20 are one or more cutting robots 30. The cutting robots 30 are configured to cut the chassis 60 in any suitable manner. For example, the cutting robots 30 are configured to cut mounting holes in the chassis 60. The mounting holes are configured for mounting various other components to the chassis 60. The cutting robots 30 are movable along tracks 50, which are on opposite sides of the chassis 60. The manufacturing system 10 further includes measuring robots 40, which are equipped with any suitable measuring systems configured to measure various datum points on the chassis 60 for guiding the cutting robots to cutting locations on the chassis 60. The measuring robots 40 are also configured to move along the tracks 50.

A control module 250 is configured to control the cutting robots 30, the measuring robots 40, and the docking station 210. The control module 250 may be a single standalone control module, or may be included with the cutting robots 30 and/or the measuring robots 40. The control module 250 may be a single control module, or configured as multiple control modules included with one or more of the cutting robots 30, the measuring robots 40, and/or the docking station 210.

The mobile cart 110 is configured to support the chassis 60. The tracks 50 of the work cell 20 are spaced apart to accommodate the cart 110 therebetween. The cart 110 is movable into and out of the work cell 20 through the opening 24. Thus, the cart 110 is also configured to transport the chassis 60 to and from the work cell 20, as well as to any other suitable manufacturing location. The cart 110 may be moved manually. Alternatively, the cart 110 may be an automated cart powered by a motor or moved in any other suitable manner.

Figure 2A:
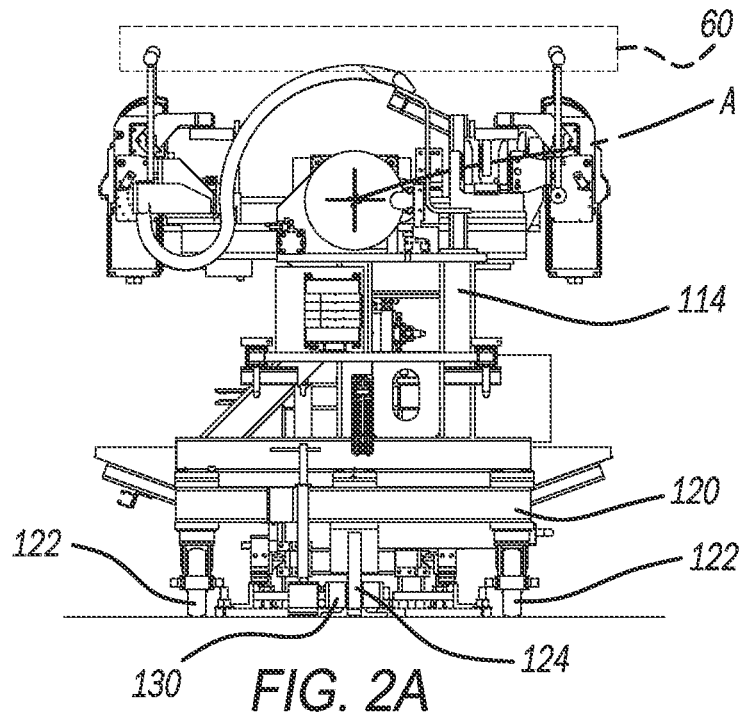
FIG. 2A is a side view of the mobile cart with the workpiece mounted thereto.
Figure 2B:
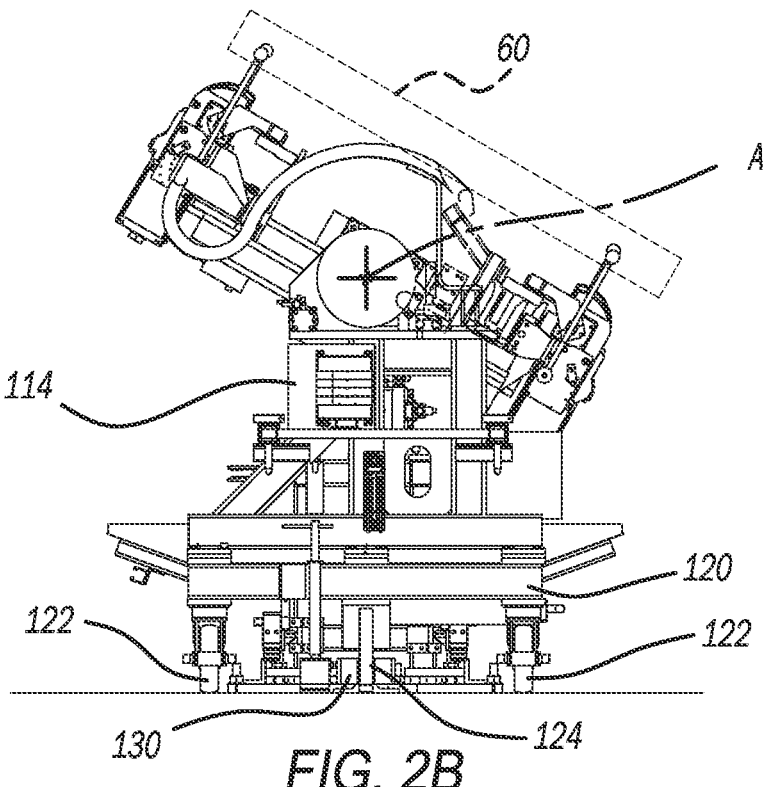
FIG. 2B is similar to FIG. 2A, but with the workpiece rotated about trunnion axis A.
Figure 3:
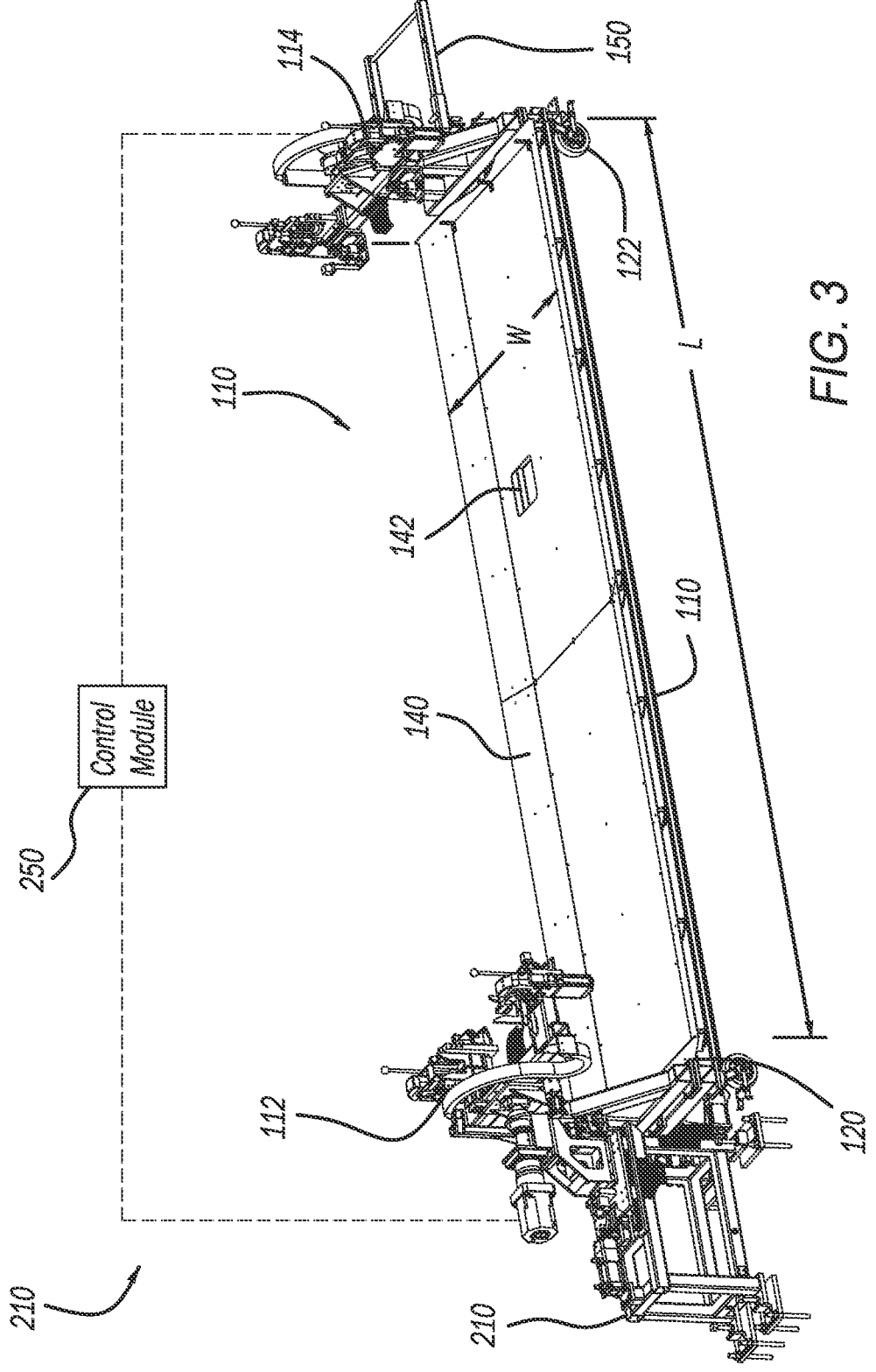
FIG. 3 is a perspective view illustrating the mobile cart and an exemplary docking station of the work cell configured to dock with the mobile cart.

With continued reference to FIG. 1, and additional reference to FIGS. 2A, 2B, and 3, the cart 110 includes a first mounting assembly 112 and a second mounting assembly 114. The first and second mounting assemblies 112, 114 are mounted to opposite ends of a base 120 of the cart 110. At an undersurface of the base 120 are wheels 122. The wheels 122 allow the cart 110 to be wheeled into and out of the work cell 20, as well as to any other manufacturing work cells and work stations.

With particular reference to FIGS. 2A and 2B, for example, the cart 110 includes a locator post 124 extending from the undersurface of the base 120 to facilitate positioning of the cart 110 within the work cell 20. The locator post 124 is configured to cooperate with a guide track 130. The track 130 may be arranged at a suitable location within the work cell 20, such as midway between the tracks 50 for the robots 30, 40. The cart 110 further includes a handle 150 (FIG. 3). The handle 150 may be grasped to facilitate manual wheeling of the cart 110 to and from the work cell 20, as well as to any other suitable workstation.

With reference to FIG. 3, between the first mounting assembly 112 and the second mounting assembly 114 is a frame 140 of the cart 110. The frame 140 has a width W and a length L. In the example illustrated, the length L of the frame 140 extends generally from the first mounting assembly 112 to the second mounting assembly 114. The width W extends perpendicular to the length L. The frame 140 defines an opening 142. The frame 140 is configured to catch portions of the chassis 60 that have been cut by the cutting robots 30 and direct the cut portions through the opening 142, where the cut portions may be gathered for further processing, recycling, disposal, etc. The frame 140 is configured to be expanded and contracted both along its width W and its length L. The frame 140 may include any suitable mechanism to accommodate such expansion and contraction. Thus, the size of the frame 140 may be customized to best accommodate the size of the chassis 60, or any other suitable workpiece.

Figure 4:
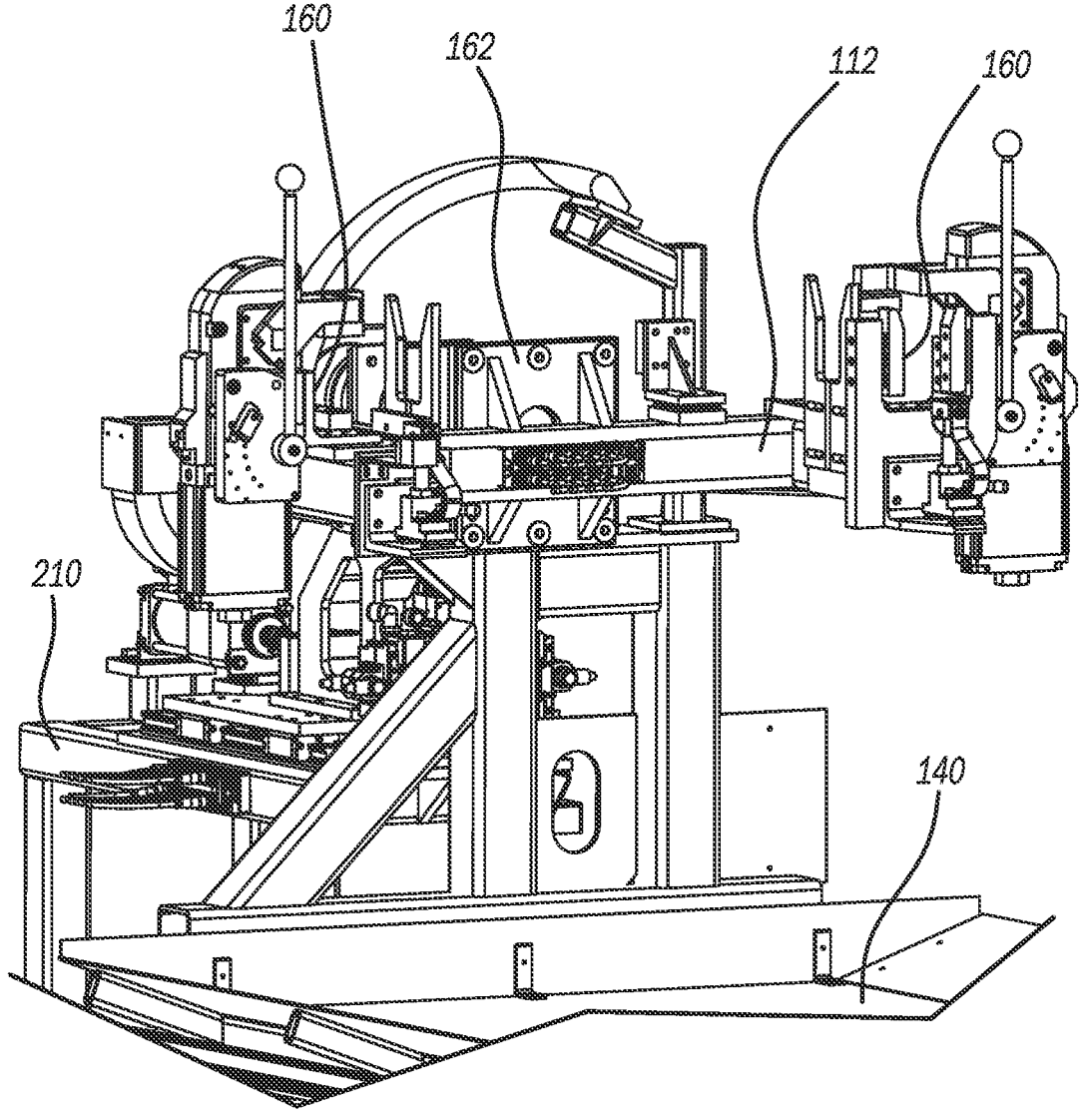
FIG. 4 is a perspective view of a first mounting assembly of the mobile cart.
Figure 5:
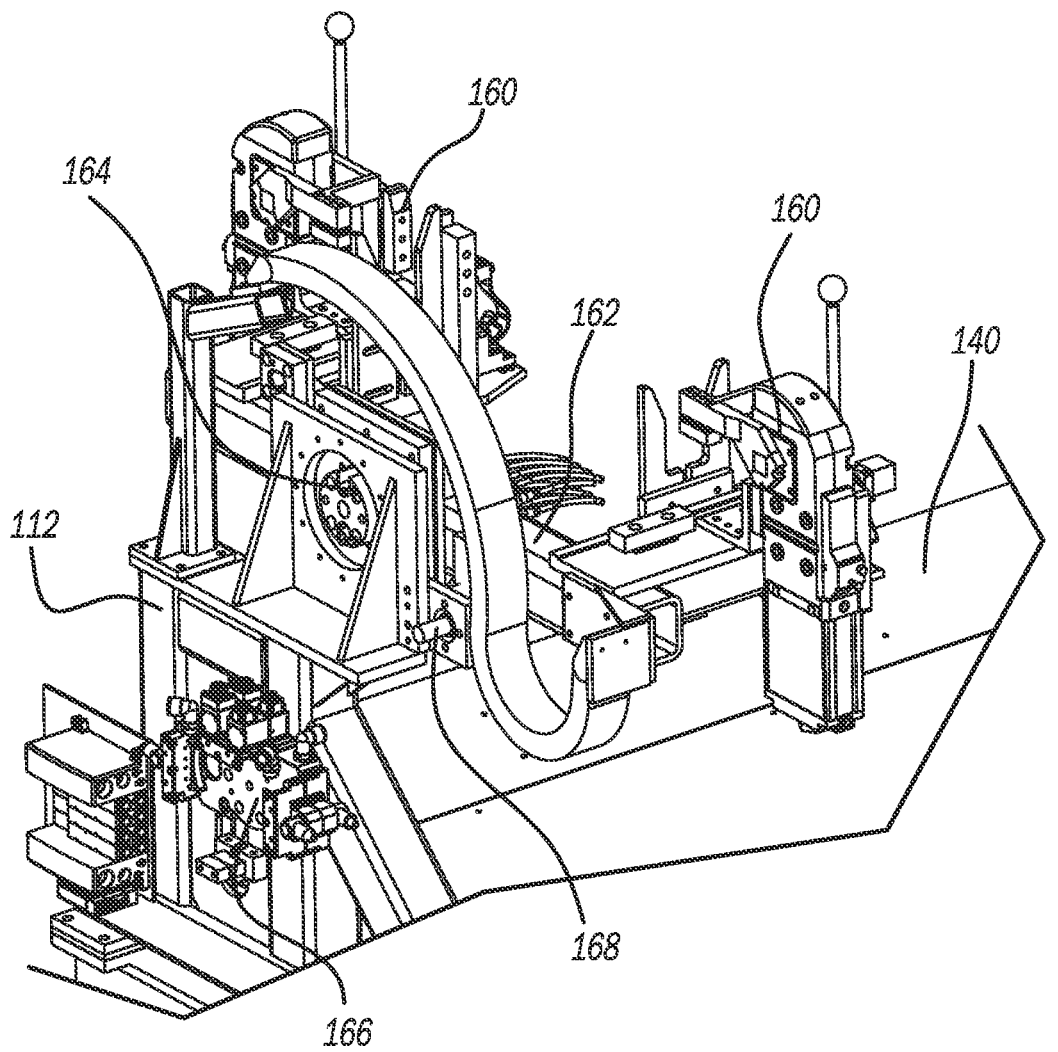
FIG. 5 is another perspective view of the first mounting assembly of the mobile cart.

With reference to FIGS. 4 and 5, for example, the first mounting assembly 112 will now be described further. The first mounting assembly 112 includes one or more first supports 160. The first supports 160 are configured in any suitable manner to cooperate with the chassis 60 to support the chassis 60. In the example illustrated, the first supports 160 are configured to cooperate with a first end 62 (FIG. 1) of the chassis 60. The first supports 160 are included with a first rotatable member 162 of the first mounting assembly 112. Thus, rotation of the first rotatable member 162 rotates the first supports 160 and the chassis 60 supported thereby.

The first rotatable member 162 is in cooperation with a first mechanical coupling 164 (see FIG. 5). As described herein, the first mechanical coupling 164 cooperates with the docking station 210 to rotate the first rotatable member 162 and the chassis 60. The first mounting assembly 112 further includes a first pneumatic and electrical coupling 166. The first pneumatic and electrical coupling 166 is configured to receive pneumatic power, and transfer electrical signals to and from the cart 110.

The first mounting assembly 112 further includes a locking and locator pin 168, as illustrated in FIG. 5, for example. The pin 168 is movable into and out of cooperation with the first rotatable member 162. When the pin 168 is in cooperation with the first rotatable member 162, the first rotatable member 162 is restricted from rotating. Thus, when the cart 110 is being transferred to and from the work cell 20, the pin 168 is typically moved into cooperation with the first rotatable member 162 to prevent the first rotatable member 162 and the chassis 60 mounted thereto from rotating. The pin 168 is also configured to cooperate with the docking station 210 to guide the cart 110 into cooperation with the docketing station 210.

Figure 6:
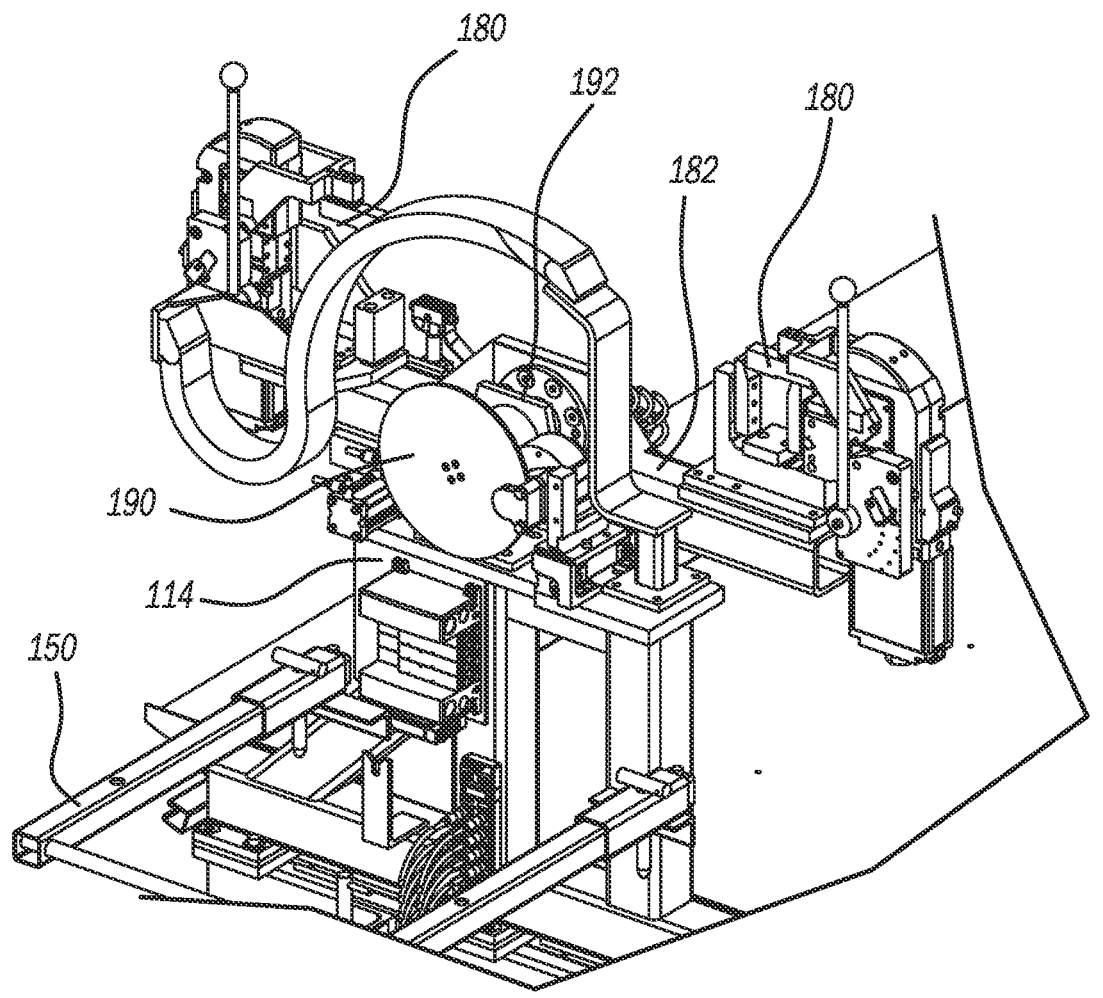
FIG. 6 is a perspective view of a second mounting assembly of the mobile cart.

With reference to FIG. 6, for example, the second mounting assembly 114 includes second supports 180, which are configured to support a second end 64 (FIG. 1) of the chassis 60. The supports 180 may be sized and shaped in any suitable manner to support the chassis 60 or any other suitable workpiece. The supports 180 are included with a second rotatable member 182 of the second mounting assembly 114. The second supports 180 are rotatable along with the second rotatable member 182 to allow rotation of the chassis 60 about the trunnion axis A.

The second mounting assembly 114 further includes an encoder 190. The encoder 190 is configured to measure rotational position of the second rotatable member 182. The encoder 190 may be a rotary encoder, or other suitable device configured to measure rotation of the second rotatable member 180. The encoder 190 is connected to the control module 250 to transfer signals to the control module indicating the position of the second rotatable member 182.

The second mounting assembly 114 further includes a brake 192. The brake 192 may be any suitable braking device or mechanism configured to prevent rotation of the second rotatable member 182. The brake 192 may be applied manually or automatically during transport of the cart 110 to prevent rotation of the second rotatable member 182 and the chassis 60 mounted thereto.

Figure 7:
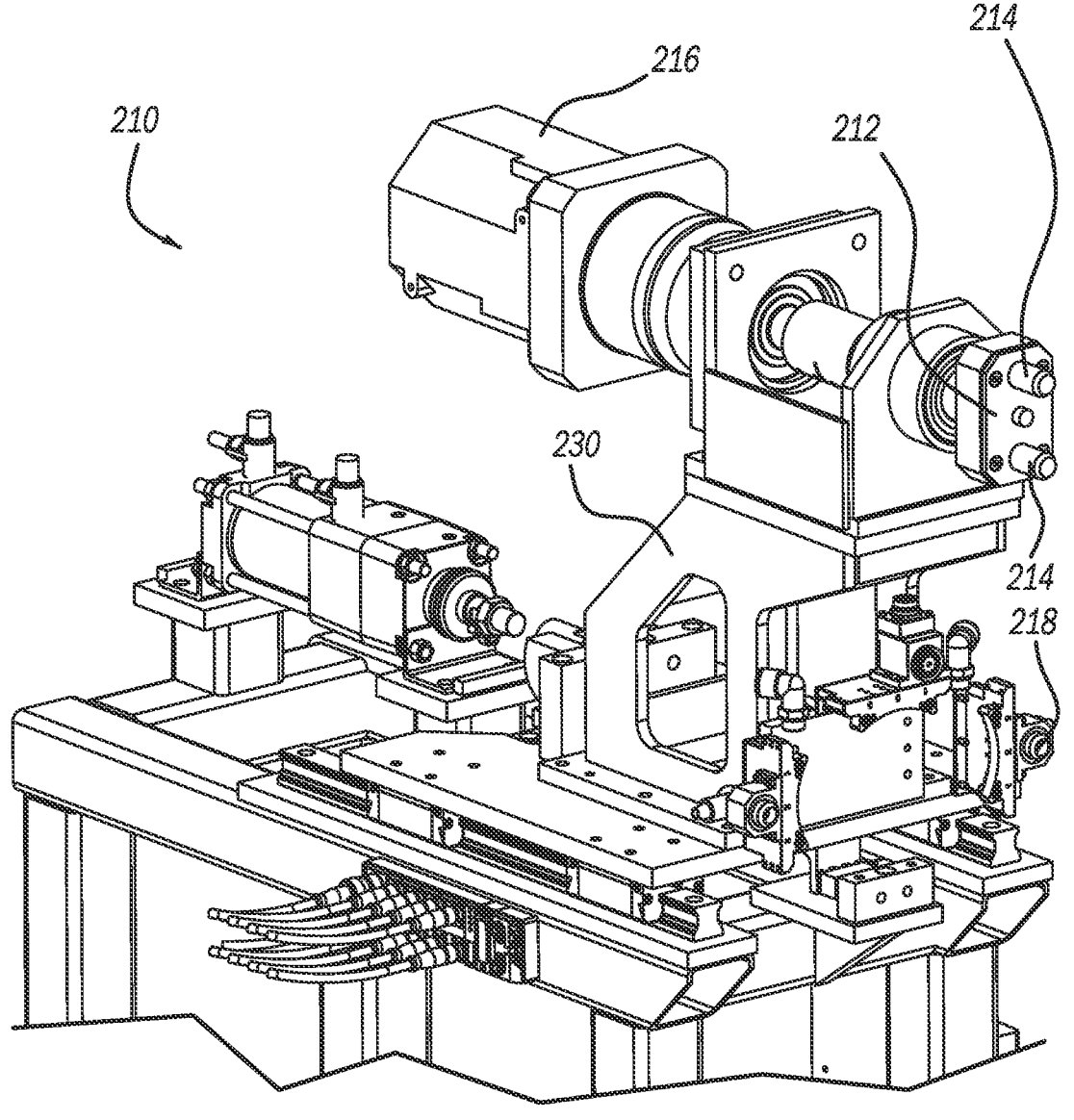
FIG. 7 is a perspective view of the docking station configured to cooperate with the mobile cart.

With reference to FIG. 7, for example, the docking station 210 generally includes a second mechanical coupling 212, which is configured to cooperate with the first mechanical coupling 164 of the first mounting assembly 112. The second mechanical coupling 212 includes a pair of posts 214, which are configured to cooperate with receptables defined at the first mechanical coupling 164. The docking station 210 also includes a motor 216, which is configured to rotate the second mechanical coupling 212. The docking station 210 further includes a second pneumatic and electrical coupling 218, which is configured to transfer pneumatic power and electrical signals to the cart 110 when the second pneumatic and electrical coupling 218 is in cooperation with the first pneumatic and electrical coupling 166.

The second mechanical coupling 212 and the second pneumatic and electrical coupling 218 are mounted to a base 230 of the docking station 210, which is configured to slide laterally towards and away from the first mounting assembly 112 of the cart 110. When the first mounting assembly 112 is proximate to the docking station 210, the base 230 may be manually or automatically moved towards the first mounting assembly 112 to bring the second mechanical coupling 212 into cooperation with the first mechanical coupling 164. The second pneumatic and electrical coupling 218 is also brought into cooperation with the first pneumatic and electrical coupling 166. The locator pin 168 is disengaged from the first rotatable member 162, to allow the first rotatable member 162 to rotate. The brake 192 of the second mounting assembly 114 is also disengaged to allow the second rotatable member 182 to rotate. With the second mechanical coupling 212 in cooperation with the first mechanical coupling 164, rotation of the second mechanical coupling 212 by the motor 216 rotates the first rotatable member 162 and the chassis 60 mounted thereto.

The motor 216 includes an encoder configured to identify the rotational position of the motor 216, which corresponds to the rotational position of the second mechanical coupling 212, the first mechanical coupling 164, and the first mounting assembly 112. Thus, the encoder of the motor 216 is configured to identify the rotational position about the trunnion axis A of the first rotatable member 162 and the chassis 60 (or any other suitable workpiece) supported by the first supports 160. Likewise, the second mounting assembly 114 includes the encoder 190, which is configured to identify the rotational position of the second rotatable member 182, the second supports 180, and the chassis 60 (or any other workpiece) supported by the second supports 180.

The control module 250 is configured to control rotation of the chassis 60 (or any other suitable workpiece) about the trunnion axis A by controlling motor 216. The control module 250 is further configured to compare the rotational position of the first rotatable member 162 with the rotational position of the second rotatable member 182 based on inputs from the encoder of the motor 216 and the encoder 190. A relative difference between the rotatable position of the first rotatable member 162 and the second rotatable member 182 indicates that the first and second rotatable members 162, 182 are rotationally offset from one another, which may lead to undesirable twisting of the chassis 60 (or any other workpiece mounted to the cart 110). Upon detecting that the difference between the rotatable position of the first rotatable member 162 and the second rotatable member 182 exceeds a predetermined difference, the control module 250 is configured to generate any suitable audible and/or visual alerts indicating that the chassis 60 may be subject to excess twisting.

Figure 8:
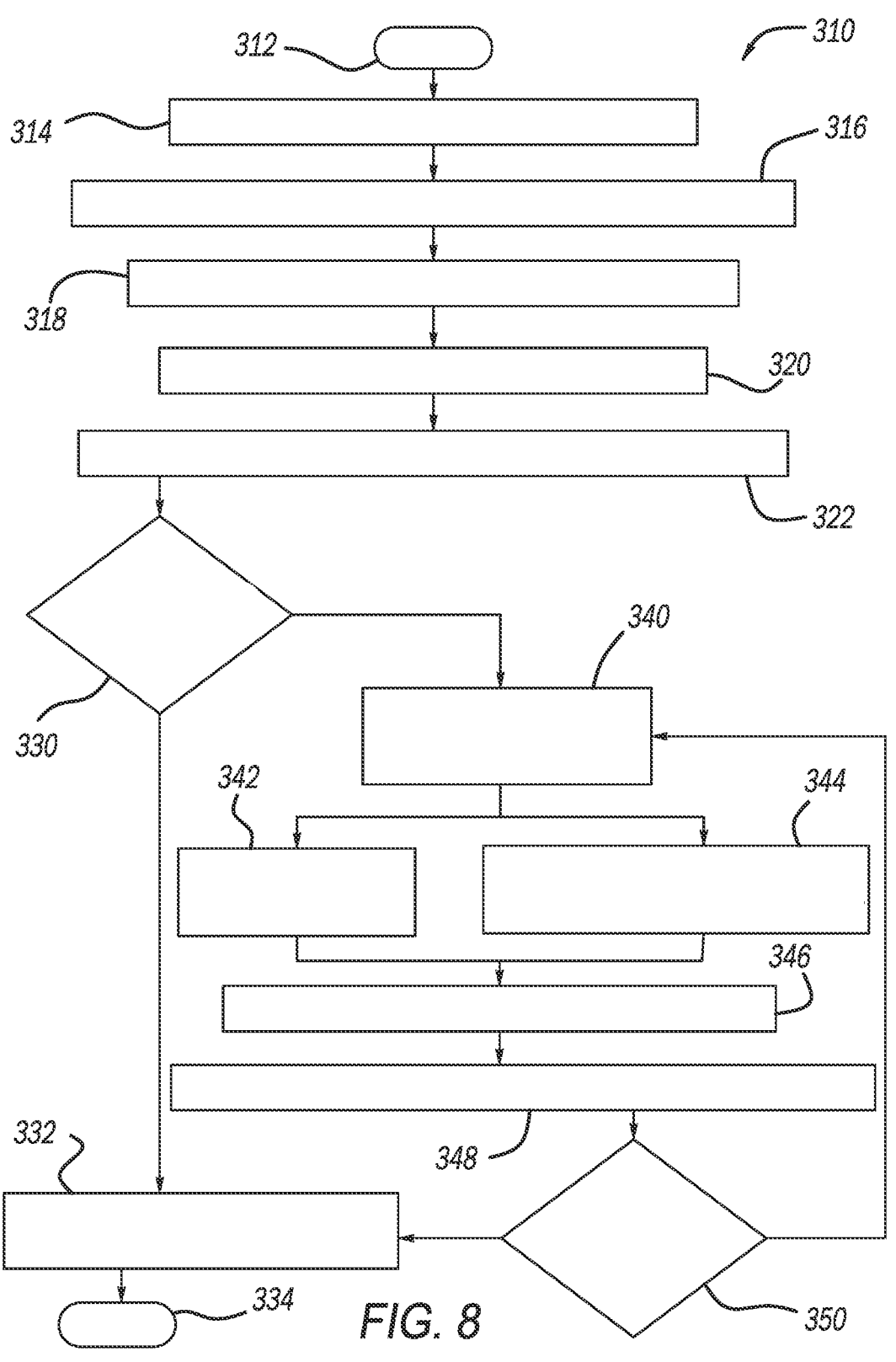
FIG. 8 illustrates a flow chart of a manufacturing method in accordance with the present disclosure.

With reference to FIG. 8, operation of the manufacturing system 10 will now be described in further detail. FIG. 8 illustrates an exemplary method 310 for operating the manufacturing system 10. The method 310 may be performed by the control module 250 or any other suitable control module, such as a control module of the cutting robots 30 and/or a control module of the measuring robots 40. The method 310 starts at block 312 and proceeds to block 314 where the cart 110 is positioned in the work cell 20 and locked into position. The cart 110 may be a robotic cart automatically moved into the work cell 20 and docked at the docking station 210. Alternatively, the cart 110 may be manually pushed into the work cell 20 and into cooperation with the docking station 210. The cart 110 may be automatically locked in position, or manually locked, such as by locking the wheels 122.

From block 314, the method 310 proceeds to block 316 where the control module 250 verifies that the cart 110 is properly positioned, such as based on inputs from any suitable position sensors within the work cell 20. If the cart 110 is in proper position proximate to the docking station 210, the control module 250 is configured to move the base 230 of the docking station 210 into cooperation with the first mounting assembly such that the second mechanical coupling 212 engages the first mechanical coupling, and such that the second pneumatic and electrical coupling 218 engages the first pneumatic and electrical coupling 166. At block 318, the control module 250 controls the measuring robots 40 to measure datums on the chassis 60 (or any other suitable workpiece) to identify the position of the chassis 60, as well as specific features on the chassis 60. At block 320, the control module 250 calculates the difference between the actual and nominal frame positions and inputs the offsets to the cutting robots 30 prior to cutting. At block 322, the control module 250 controls the cutting robots 30 to perform a requested cutting operation at the current position of the chassis 60 on the trunnion axis A.

From block 322, the method 310 proceeds to block 330. At block 330, the control module 250 determines whether the chassis 60 needs to be rotated about the trunnion axis A for more cutting to be performed based on a cutting schedule accessible by the control module 250 or input to the control module 250. If another trunnion position is not required, the method 310 proceeds to block 332, where the control module 250 operates the motor 216 as necessary to return the chassis 60 to its home position on the trunnion axis A and decouples the first mounting assembly 112 from the docking station 210, such as by sliding the base 230 away from the first mounting assembly 112.

If at block 330 the control module 250 determines that the chassis 60 needs to be rotated about the trunnion axis A to carry out additional cutting by the cutting robots 30, the method 310 proceeds from block 330 to block 340. At block 340, the control module 250 controls the motor 216 to rotate the chassis 60 about the trunnion axis A. Once the chassis 60 has been rotated to the new position, the control module 250 is configured to actuate the brake 192 of the second mounting assembly 114 and any suitable brake at the first mounting assembly 112 and/or the motor 216 to lock the chassis 60 in the new rotational position. From block 340, the method 310 proceeds to block 342 or block 344. At block 342, the control module 250 controls the measuring robots 40 to re-measure the datums on the chassis 60 and account for the new rotational position of the chassis 60. At block 344, the control module 250 calculates the new rotational position of the chassis 60 based on feedback from the encoder of the motor 216 and the encoder 190.

From blocks 342, 344, the method 310 proceeds to block 346 at which the control module 250 calculates new offsets, and sends the positional information to the cutting robots 30. At block 348, the control module 250, or any other suitable control module, operates the cutting robots 30 to perform additional cutting at the new rotational position of the chassis 60. From block 348, the method 310 proceeds to block 350, where the control module 250 determines whether or not a new position of the chassis 60 about the trunnion axis A is required for additional cutting. If a new position about the trunnion axis A is required, the method 310 proceeds from block 350 back to block 340. If a new rotational position is not required, the method 310 proceeds from block 350 to block 332, and the method 310 ends at block 334. Every rotation of the chassis 60 (or any other suitable workpiece) may be followed by a measurement of the datum features by the measuring robots 40. Therefore, the trunnion axis A may be added to one of the measuring robots 40, as opposed to one of the cutting robots 30. Alternatively, the control module 250 may be included with the cutting robots 30 and configured to control the motor 216 to control the rotational position of the chassis 60 about the trunnion axis A. Thus, the trunnion position of the chassis 60 may be controlled as an additional axis of the cutting robots 30 to permit cutting of the chassis 60 while the chassis 60 is being rotated about the trunnion axis A.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A manufacturing system configured for processing a workpiece, the manufacturing system comprising:
    a mobile cart including:

a first mounting assembly and a second mounting assembly both configured to support the workpiece, and the first mounting assembly further configured to rotate the workpiece; and a first mechanical coupling in cooperation with the first mounting assembly such that rotation of the first mechanical coupling rotates the first mounting assembly; and a docking station including a second mechanical coupling and a motor configured to rotate the second mechanical coupling, the second mechanical coupling configured to cooperate with the first mechanical coupling such that rotation of the second mechanical coupling rotates the first mechanical coupling and the workpiece supported by the first mounting assembly and the second mounting assembly, wherein the first mounting assembly includes a first brake and the second mounting assembly includes a second brake, the first brake and the second brake are configured to prevent rotation of the first mounting assembly and the second mounting assembly respectively when the mobile cart is disconnected from the docking station.

2. The manufacturing system of claim 1, wherein the first mounting assembly and the second mounting assembly are configured to rotate to any position about an axis up to 360°.

3. The manufacturing system of claim 1, wherein:

the mobile cart further includes a first pneumatic coupling and a first electrical coupling; and the docking station further includes a second pneumatic coupling and a second electrical coupling configured to couple with the first pneumatic coupling and the first electrical coupling respectively to transfer pneumatic power and control signals from the docking station to the mobile cart.

4. The manufacturing system of claim 1, wherein:

the docking station includes a first encoder configured to measure a first rotational position of the second mechanical coupling and generate a first signal identifying the first rotational position, the first rotational position corresponds to a rotational orientation of the first mounting assembly;

the second mounting assembly includes a second encoder configured to measure a second rotational position of the second mounting assembly and generate a second signal identifying the second rotational position; and a control module configured to receive the first signal and the second signal, and generate a notification when a difference between the first rotational position and the second rotational position exceeds a predetermined difference, the notification indicating that a workpiece mounted to the first mounting assembly and the second mounting assembly is being twisted.

5. The manufacturing system of claim 1, wherein:

between the first mounting assembly and the second mounting assembly is a base defining a clean out for material cut from the workpiece; and the base is adjustable lengthwise and widthwise to accommodate different sized workpieces.

6. The manufacturing system of claim 1, wherein the mobile cart further includes wheels.

7. The manufacturing system of claim 6, wherein the mobile cart further includes a handle and is configured to be pushed by a user.

8. The manufacturing system of claim 1, wherein the workpiece is a vehicle chassis.

9. The manufacturing system of claim 8, wherein the first mounting assembly and the second mounting assembly are on opposite ends of the mobile cart and are configured to couple to opposite ends of the vehicle chassis to rotate the vehicle chassis about a longitudinal axis thereof.

10. The manufacturing system of claim 1, wherein the docking station is mounted in a work cell including a cutting robot configured to cut the workpiece and a measuring robot configured to track movement of the workpiece.

11. The manufacturing system of claim 10, further comprising a control module configured to control the measuring robot and the motor of the docking station to control rotation of the workpiece when the mobile cart is in cooperation with the docking station.

12. The manufacturing system of claim 10, further comprising a control module configured to control both the cutting robot and the motor of the docking station to simultaneously control rotation of the workpiece and cutting of the workpiece by the cutting robot.

13. A manufacturing system configured for processing a vehicle chassis, the manufacturing system comprising:

work cell including:

a cutting robot;

a measuring robot; and a docking station including a drive unit;

a mobile cart configured to be moved into and out of the work cell, the mobile cart including:

a first rotatable member spaced apart from a second rotatable member, both the first rotatable member and the second rotatable member are configured to support and rotate the vehicle chassis about a trunnion axis of the vehicle chassis; and a mechanical coupling in cooperation with the first rotatable member, the mechanical coupling configured to cooperate with the drive unit of the docking station such that rotation of the drive unit rotates the mechanical coupling and the first rotatable member; and a control module configured to control the measuring robot and the drive unit, and incorporate the trunnion axis as an axis of the measuring robot;

wherein:

after rotation of the vehicle chassis by the first rotatable member and the second rotatable member about the trunnion axis, the control module is configured to identify a rotated position of the vehicle chassis and input the rotated position to the measuring robot; and the control module is configured to identify the rotated position based on at least one of a degree of rotation of the drive unit and location of a datum point on the vehicle chassis identified by the measuring robot.

14. The manufacturing system of claim 13, wherein:

the docking station includes a first encoder configured to measure a first rotational position of the drive unit and generate a first signal identifying the first rotational position, the first rotational position corresponds to a rotational orientation of the first rotatable member;

the second rotatable member is in cooperation with a second encoder configured to measure a second rotational position of the second rotatable member and generate a second signal identifying the second rotational position; and a control module configured to receive the first signal and the second signal, and generate a notification when a difference between the first rotational position and the second rotational position exceeds a predetermined difference, the notification indicating that the vehicle chassis is being twisted.

15. The manufacturing system of claim 13, wherein the control module is further configured to control the cutting robot and incorporate the trunnion axis as an axis of the cutting robot; and wherein the control module is configured to simultaneously control the drive unit to rotate the vehicle chassis about the trunnion axis and control the cutting robot to cut the vehicle chassis.

16. The manufacturing system of claim 13, wherein the mobile cart further includes wheels.

17. The manufacturing system of claim 16, wherein the mobile cart further includes a handle and is configured to be pushed by a user.

18. A manufacturing system configured for processing a vehicle chassis, the manufacturing system comprising:

work cell including:
    a cutting robot;
    a measuring robot;
    a docking station including a drive unit; and a control module configured to simultaneously control the drive unit and the cutting robot; and a mobile cart configured to be moved into and out of the work cell and docked with the docking station, the mobile cart including:

a first rotatable member spaced apart from a second rotatable member, both the first rotatable member and the second rotatable member are configured to support the vehicle chassis for rotation about a trunnion axis of the vehicle chassis; and a mechanical coupling in cooperation with the first rotatable member, the mechanical coupling configured to cooperate with the drive unit of the docking station such that rotation of the drive unit rotates the mechanical coupling and the first rotatable member;

wherein the control module is configured to:
    incorporate the trunnion axis as an axis of the cutting robot; and
    simultaneously control the drive unit to rotate the vehicle chassis about the trunnion axis and control the cutting robot to cut the vehicle chassis.

*    *    *    *    *